United States Patent [19]
Johnson

[11] 3,788,348
[45] Jan. 29, 1974

[54] VALVE GUIDE
[75] Inventor: Kenneth R. Johnson, Minneapolis, Minn.
[73] Assignee: Parker-Hannifin Corporation, Cleveland, Ohio
[22] Filed: Nov. 3, 1971
[21] Appl. No.: 195,141

[52] U.S. Cl.............................. 137/542, 137/614.04
[51] Int. Cl............................................. F16k 15/02
[58] Field of Search . 137/533.19, 533.21, 542, 543, 137/543.13, 614.02, 614.03, 614.04

[56] References Cited
UNITED STATES PATENTS

| | | | |
|---|---|---|---|
| 3,097,666 | 7/1963 | Antrim et al. | 137/543.13 X |
| 2,706,646 | 4/1955 | Olson | 137/614.04 |
| 3,473,782 | 10/1969 | Gessic | 137/614.04 X |
| 2,594,641 | 4/1952 | Griffith et al. | 137/543 |
| 2,823,048 | 2/1958 | Hansen | 137/614.04 X |

Primary Examiner—Robert G. Nilson
Attorney, Agent, or Firm—John N. Wolfram

[57] ABSTRACT

A valve device having a guide for a reciprocating valve element, the guide having a tubular portion of substantial length slidably receiving a stem on the valve element, radial flange portions at one end of the tubular portion, and circumferentially spaced fingers extending generally axially from said flange portions, the fingers having radially outwardly extending portions sprung into a groove around a bore in which the guide is mounted, and a spring over the tubular portion engaging the flange portions and valve element for urging the latter to closed position, the fingers between said flange portions and said extending portions having an outside diameter substantially the same as the outside diameter of said spring.

2 Claims, 3 Drawing Figures

PATENTED JAN 29 1974     3,788,348

VALVE GUIDE

BACKGROUND OF THE INVENTION

In check valves utilizing a reciprocating poppet type valve element it is desirable to guide the element so that it will not tilt and jam when it is away from its seat. Heretofore guide means for such poppets have been either expensive to make and/or assemble within the valve body, or have not provided sufficient support to keep the valve element from tilting. Also, it has not always been possible to position the spring for closing the poppet so that it would be adequately supported and guided and offer minimal resistance to fluid flow.

SUMMARY OF THE INVENTION

The present invention overcomes the above disadvantages by providing a guide with a relatively long tubular portion to receive and guide the valve stem, the guide having radial flange portions at one end and having circumferentially spaced fingers extending axially from the flange portions, the fingers having radially outwardly extending portions that snap into an annular groove around a valve body bore in which the guide is mounted, and a spring having a close fit over the tubular portion so as to be guided thereby. The spring engages the glange portions and the valve element to urge the valve element toward closed position.

DESCRIPTION

Coupling socket 10 and nipple 11 typify valve devices that may advantageously use the present invention. In this instance socket 10 and nipple 11 are valved coupling elements that may be quickly connected to and disconnected from each other. Each has a valve element 12, 13 that opens upon connecting of the parts and closes upon disconnect, and each valve elements is supported by identical guide sleeves 15.

Figure 2:
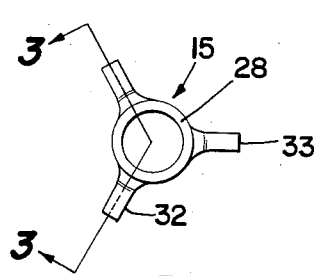
FIG. 2 is an end view of the valve guide.
Figure 3:
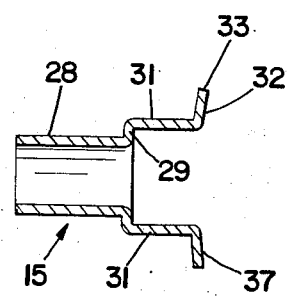
FIG 3 is a side view of the valve guide.

Nipple 11 has a body 20 with an opening therethrough that includes bore 21, counterbore 22 and a recess 23. Adjacent bore 21 is a valve seat 26. An annular groove 27 surrounds conterbore 22. Mounted in counterbore 22 is guide sleeve 15 which has a tubular portion 28 with radially extending flange portions 29 at one end thereof and three fingers 31 extending axially from the flange portions and paralledl to the longidudinal axis of tubular portion 28. The free ends 32 of fingers 31 are bent to extend radially outwardly. When guide sleeve 15 is in an initial condition prior to assembly into the nipple, as shown in figures 2 and 3, the finger portions 32 have their radial ends 33 lying in a circle whose diameter is larger than the outer diameter of groove 27 and the finger portions 32 are substantially normal to the longitudinal axis of tubular portion 28.

Guide sleeve 15 is made of springy material, such as stainless steel, so that fingers 31 can be sprung inwardly, with ends 32 snapped into groove 27 and retained therein by the spring action of fingers 31.

Prior to installation of guide sleeve 15 into counterbore 22, spring 36 is slipped over tubular portion 28 with which it has a close guide fit and with one end of the spring against flange portions 29. Valve element 13 is then assembled with stem 37 within tubular portion 28. The parts are then inserted into counterbore 22 and finger ends 32 snapped into groove 27.

Figure 1:
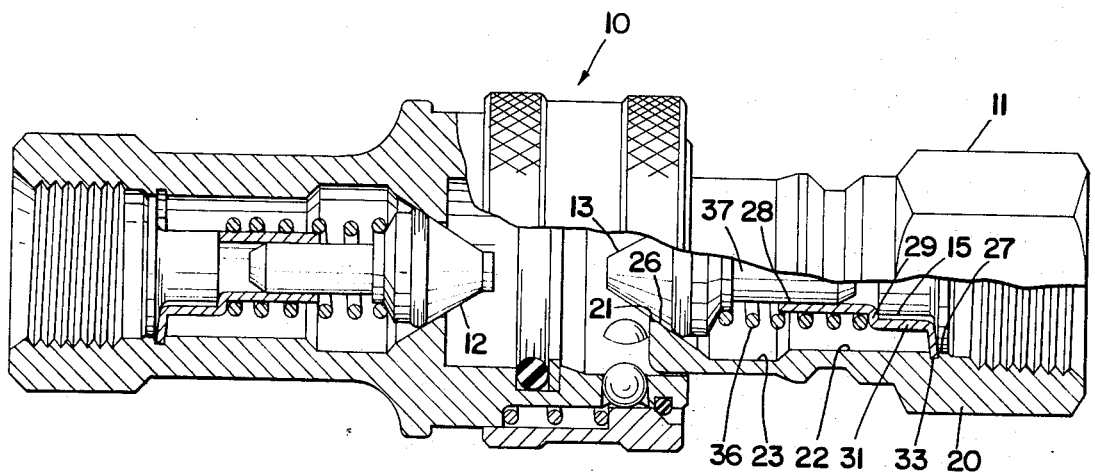
FIG. 1 is a view mostly in cross section of a quick disconnect coupling socket with a nipple partially inserted therein and both having a valve guide in accordance with the present invention.

When valve element 13 is in its closed position against seat 26, the inner end of stem 37 remote from valve element 13 is within tubular portion 28. When valve element 13 is in its full open position against tubular portion 28, the inner end of stem 37, which has a substantial chamfer, projects a short distance within fingers 31 but remains axially spaced from radially outwardly extending finger ends 32, as will be evident from figure 1.

When the nipple 11 is coupled to socket 10 the two valve elements 12, 13 engage and force each other to open position. Fluid flow then passes between fingers 31 and over spring 36 in each coupling half, the spring thus providing a minimum of resistance to flow.

Because the outside surfaces of fingers 31 lie in a circle of substantially the same diameter as the outside diameter of spring 36 and the fingers extend parallel to the longidudinal axis of tubular portion 28, guide sleeve 15 has no portions extending radially beyond the outside diameter of spring 36 that would obstruct axial flow of fluid, except for finger ends 32. Also, because the inner end of stem 37 is chamfered and extends only part way within fingers 31 the entire area radially within finger ends 32 is unobstructed and provides a large flow path for fluid that will pass radially between axially extending fingers 31.

I claim:

1. A valve device comprising a body having a bore therethrough, a valve seat surrounding the bore, an annular groove radially outward of the bore and spaced axially of the seat, valve guide in said bore, said valve guide comprising a tubular portion having radially extending and circumferentially spaced flange portions at one end, a plurality of circumferentially spaced fingers extending axially from said flange portions in a direction away from said tubular portion, said fingers having radially outwardly extending portions received in said groove, and a valve element in said bore having a valve head movable to open and closed positions relative to said seat for controlling flow of fluid through said bore, said element having a stem projecting from said head and slidably received within said tubular portion, a coil spring closely fitted over said tubular portion and engaging said head and said flange portions to urge the valve element toward said seat, said finger axial portions throughout the greater portion of their length extending substantially parallel to the axis of said tubular portion and lying within a circle of substantially no greater diameter than the outside diameter of said spring, said stem in all positions of said valve element being axially spaced from said radially outwardly extending finger portions so as to permit unobstructed fluid flow through the entire region located radially within said radially outwardly extending finger portions.

2. The device of claim 1 in which said stem has a guide portion closely fitting the inside of said tubular portion the end of said stem remote from said valve element is within said tubular portion when said valve element is against said seat, and when said valve element is in the full open position said guide portion remains axially spaced a substantial distance from said finger radially portions on the side thereof toward said tubular portion.

\* \* \* \* \*